(12) United States Patent
Terayama et al.

(10) Patent No.: US 12,009,558 B2
(45) Date of Patent: Jun. 11, 2024

(54) FUEL CELL SYSTEM AND METHOD FOR CONTROLLING FUEL CELL SYSTEM

(71) Applicant: Panasonic Intellectual Property Management Co., Ltd., Osaka (JP)

(72) Inventors: Takeshi Terayama, Osaka (JP); Tomohiro Kuroha, Osaka (JP); Kyohei Kawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 406 days.

(21) Appl. No.: 17/551,192

(22) Filed: Dec. 15, 2021

(65) Prior Publication Data
US 2022/0109172 A1 Apr. 7, 2022

Related U.S. Application Data

(63) Continuation of application No. PCT/JP2020/023439, filed on Jun. 15, 2020.

(30) Foreign Application Priority Data
Jul. 19, 2019 (JP) ................. 2019-133330

(51) Int. Cl.
*H01M 8/04746* (2016.01)
*H01M 8/04303* (2016.01)
(Continued)

(52) U.S. Cl.
CPC ... *H01M 8/04753* (2013.01); *H01M 8/04303* (2016.02); *H01M 8/1213* (2013.01); *H01M 2008/1293* (2013.01)

(58) Field of Classification Search
CPC ......... H01M 8/04753; H01M 8/04303; H01M 8/1213; H01M 2008/1293
See application file for complete search history.

(56) References Cited

U.S. PATENT DOCUMENTS

2011/0076573 A1 3/2011 Akikusa et al.

FOREIGN PATENT DOCUMENTS

GB 2439653 A * 1/2008 ........ H01M 8/04022
JP 2006-294508 10/2006
(Continued)

OTHER PUBLICATIONS

Machine Translation of TW-200941813-A (Jun. 23, 2023) (Year: 2023).*

(Continued)

*Primary Examiner* — Matthew J Merkling
(74) *Attorney, Agent, or Firm* — Rimon P.C.

(57) ABSTRACT

A fuel cell system according to the present disclosure includes: a solid oxide fuel cell that produces electricity from an electrochemical reaction by using a fuel and air and that includes a membrane electrode assembly including a proton-conductive electrolyte membrane, a cathode disposed on a first main surface of the electrolyte membrane, and an anode disposed on a second main surface of the electrolyte membrane; and a controller. In the operation stop process for stopping operation of the fuel cell system, the controller is configured to control supply of the fuel at a higher flow rate than the flow rate of the fuel consumed in the solid oxide fuel cell in an open circuit state.

9 Claims, 5 Drawing Sheets

(51) Int. Cl.
*H01M 8/12* (2016.01)
*H01M 8/1213* (2016.01)

(56) References Cited

FOREIGN PATENT DOCUMENTS

| | | | | |
|---|---|---|---|---|
| JP | 2017-111922 | | 6/2017 | |
| JP | 2017-145445 | | 8/2017 | |
| JP | 2018-014204 | A | 1/2018 | |
| JP | 2018-170200 | | 11/2018 | |
| TW | 200941813 | A * | 10/2009 | ............... C01B 3/38 |
| WO | WO-2013001166 | A1 * | 1/2013 | ............ H01M 16/00 |

OTHER PUBLICATIONS

English Translation of Chinese Search Report dated Sep. 8, 2023 for the related Chinese Patent Application No. 202080021782.0.
International Search Report of PCT application No. PCT/JP2020/023439 dated Aug. 25, 2020.

* cited by examiner

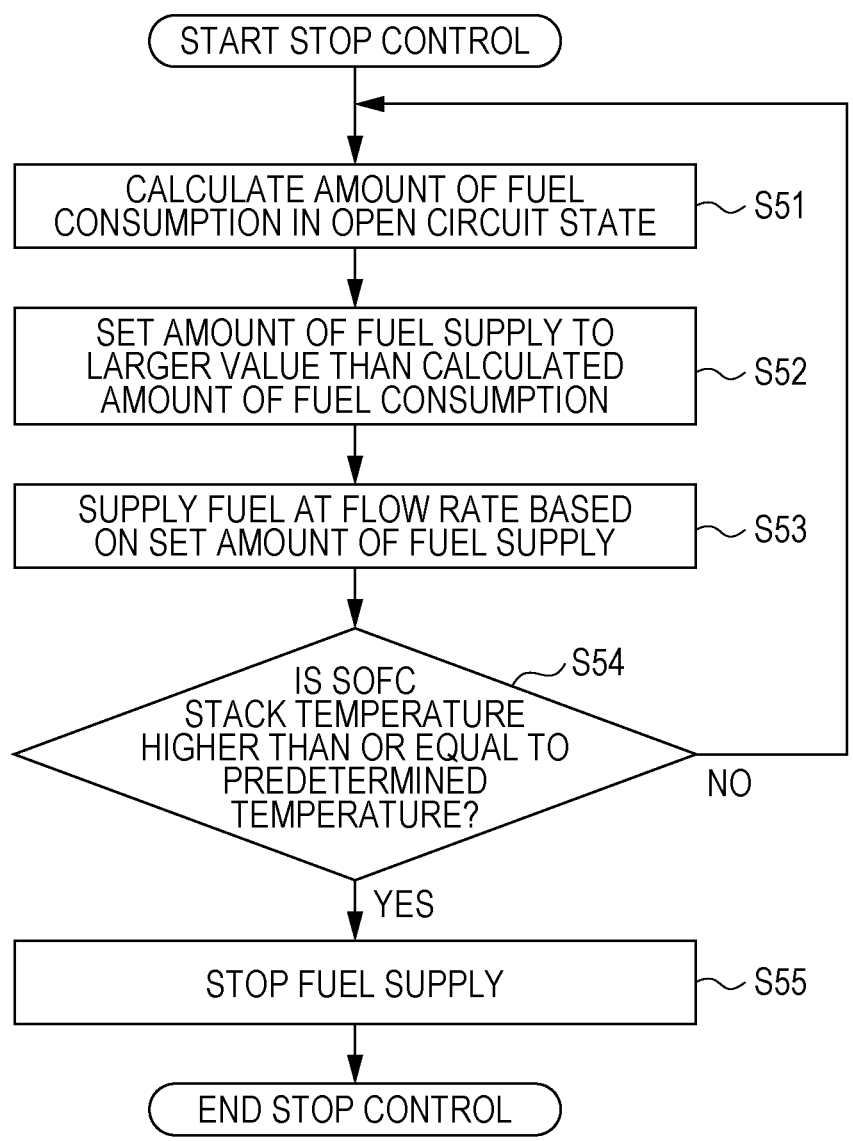

FUEL CELL SYSTEM AND METHOD FOR CONTROLLING FUEL CELL SYSTEM

BACKGROUND

1. Technical Field

The present disclosure relates to a fuel cell system and a method for controlling the fuel cell system.

2. Description of the Related Art

For example, solid oxide fuel cells (hereinafter may be referred to as SOFCs) are known as one type of electrochemical devices including electrolyte membranes made of solid oxides. In general, oxide ion conductors, typically stabilized zirconia, are widely used as electrolyte materials for SOFCs. Since the ionic conductivity of oxide ion conductors decreases with decreasing temperature, solid oxide fuel cells including stabilized zirconia as an electrolyte material need to operate at a temperature of, for example, 700° C. or higher. In recent years, SOFCs operable at about 600° C. and using electrolyte materials with proton conductivity have attracted attention due to chemical stability of components and low costs.

To safely stop a fuel cell system including an SOFC, various processes are performed in the operation stop process. As an example of the processes, a voltage limit control (VLC) process for quickly reducing the voltage by setting the current to be drawn from the SOFC to a predetermined current has been proposed (e.g., Japanese Unexamined Patent Application Publication No. 2017-111922 (PTL 1)).

In the VLC process for the fuel cell system according to PTL 1, the stop control includes continuously supplying the fuel to the anode with the current drawn to the outside until the cell voltage decreases to a predetermined value or lower. This control allows the fuel cell system according to PTL 1 to undergo less anode oxidation degradation during the VLC process.

SUMMARY

However, when the stop control includes continuously supplying the fuel to the anode with the current drawn to the outside until the cell voltage decreases to a predetermined value or lower as in the fuel cell system according to PTL 1, a solid oxide fuel cell including a proton-conductive electrolyte membrane may be damaged by fuel shortages.

One non-limiting and exemplary embodiment provides a fuel cell system that can safely stop without damaging a solid oxide fuel cell including a proton-conductive electrolyte membrane.

In one general aspect, the techniques disclosed here feature a fuel cell system including: a solid oxide fuel cell that produces electricity from an electrochemical reaction by using a fuel and air and that includes a membrane electrode assembly including a proton-conductive electrolyte membrane, a cathode disposed on a first main surface of the electrolyte membrane, and an anode disposed on a second main surface of the electrolyte membrane; and a controller. In an operation stop process for stopping operation of the fuel cell system, the controller is configured to control supply of the fuel at a higher flow rate than a flow rate of the fuel consumed in the solid oxide fuel cell in an open circuit state.

A fuel cell system according to the present disclosure has the configuration described above and has an advantageous effect of being able to safely stop without damaging a solid oxide fuel cell including a proton-conductive electrolyte membrane.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a flowchart of an example stop control performed in an operation stop process for the fuel cell system shown in FIG. 6.

DETAILED DESCRIPTION

Figure 1:
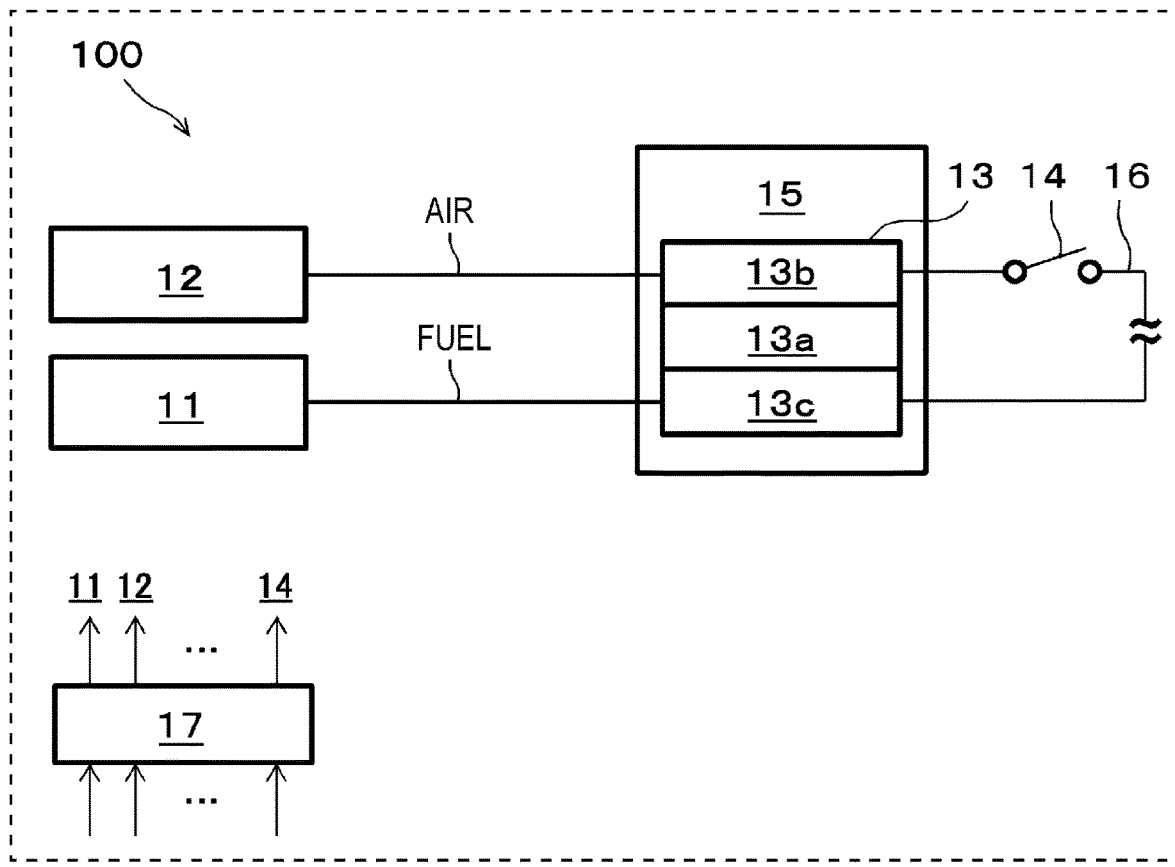
FIG. 1 is a block diagram schematically illustrating an example configuration of a fuel cell system according to a first embodiment of the present disclosure.

Underlying Knowledge Forming Basis of the Present Disclosure

Examples of electrolyte materials having proton conductivity include oxides. Specific examples include ion conductors composed of perovskite composite oxides having compositions represented by $BaCe_{1-x}M_xO_{3-\alpha}$, $BaZr_{1-x-y}Ce_xM_yO_{3-\alpha}$, or $BaZr_{1-x}M_xO_{3-\alpha}$ (M is a trivalent substituent element, the value of x satisfies $0<x<1$, the value of y satisfies $0<y<1$ and $(x+y)=1$, and $\alpha$ is an oxygen deficiency and satisfies $0<\alpha<0.5$). The electrolyte materials have hole conductivity in addition to proton conductivity.

In an SOFC including such an electrolyte membrane made of a proton conductor having hole conductivity, part of the current produced by electricity generation flows in the electrolyte membrane without being drawn to the outside. In an SOFC including an electrolyte membrane made of an oxide ion conductor, such as stabilized zirconia, the electrolyte membrane has extremely low hole conductivity, and thus the current produced by electricity generation is all drawn to the outside.

There is the following difference between an SOFC including an electrolyte membrane made of a proton conductor and an SOFC including an electrolyte membrane made of an oxide ion conductor. For the former SOFC, the amount of fuel consumption calculated from the drawn current flowing in an external circuit connected to the SOFC deviates from the actual amount of fuel consumption. For the latter SOFC, the amount of fuel consumption calculated from the drawn current agrees with the actual amount of fuel consumption.

In other words, the relationship between the drawn current and the amount of fuel consumption in the SOFC including an electrolyte membrane made of an oxide ion conductor can be represented by Formula (1) below, where the type of consumed fuel is hydrogen and F denotes the Faraday constant.

Amount of fuel consumption [mol/s]=drawn current [$A$]/2$F$ [C/mol]  (1)

In other words, the electrolyte material in the SOFC including an electrolyte membrane made of an oxide ion conductor has almost no hole conductivity. Thus, electrons produced by the electrochemical reaction in the SOFC including an electrolyte membrane made of an oxide ion conductor do not pass through the electrolyte membrane but all flow into an external load through the external circuit. Therefore, the relationship between the drawn current and the amount of fuel consumption is represented by Formula (1) above.

When the SOFC including an electrolyte membrane made of an oxide ion conductor is in an open circuit state, there is no passage through which a current flows between the anode and the cathode, and the drawn current flowing in the external circuit is zero. Therefore, the amount of fuel consumption is zero when the SOFC including an electrolyte membrane made of an oxide ion conductor is in the open circuit state.

As described above, the amount of fuel consumption in the SOFC including an electrolyte membrane made of an oxide ion conductor is zero when the drawn current flowing in the external circuit connected to the SOFC is zero. Unless there are factors other than the electrochemical reaction, stopping fuel supply will not cause fuel shortages. The open circuit state refers to the state of the SOFC from which no current is drawn to an external load.

For the SOFC including an electrolyte membrane made of a proton conductor, some of electrons produced by the electrochemical reaction can flow not only in an external circuit but also in the electrolyte membrane. The current generated by the electrochemical reaction, the drawn current flowing in the external circuit, and the current (i.e., electron-hole current) flowing through the electrolyte membrane establish the relationship represented by Formula (2) below.

Current [$A$] produced by electrochemical reaction=drawn current [$A$] flowing in external circuit+current [$A$] flowing through electrolyte membrane  (2)

When the type of consumed fuel is hydrogen, and the Faraday constant is denoted by F, the amount of fuel consumption as indicated by Formula (3) below can be obtained from Formula (2).

Amount of fuel consumption [mol/s]=(drawn current [$A$] flowing in external circuit+current [$A$] flowing through electrolyte membrane)/2$F$ [C/mol]  (3)

Even at a drawn current of 0 in the open circuit state of the SOFC including an electrolyte membrane made of a proton conductor, electrons produced by the electrochemical reaction flow through the electrolyte membrane, and the amount of fuel consumption is not zero as indicated by Formula (3).

It is assumed that, for example, the SOFC including an electrolyte membrane made of a proton conductor is set as follows: the operating temperature is 600° C.; the density of the current drawn from the fuel cell stack is 0.22 A/cm$^2$; and the proportion of the fuel consumed during electricity generation relative to the amount of fuel supply is 85%. Under these conditions, the amount of fuel consumption in the SOFC including an electrolyte membrane made of a proton conductor in the open circuit state is found to be more than or equal to 25% of the amount of fuel supply.

The SOFC including an electrolyte membrane made of a proton conductor thus consumes an amount of fuel greater than or equal to the amount of fuel consumption estimated from the current drawn to the outside. To prevent fuel shortages in the operation stop process for the fuel cell system, the SOFC including an electrolyte membrane made of a proton conductor thus requires a distinctive control different from that for the SOFC including an electrolyte membrane made of an oxide ion conductor. With regard to the SOFC including an electrolyte membrane made of a proton conductor, however, there has been no study about fuel cell systems that can stop without damage to the SOFC from fuel shortages.

The inventors of the present disclosure have carried out intensive studies about fuel cell systems that can stop without, from fuel shortages, damage to the SOFC including an electrolyte membrane made of a proton conductor. As a result, the following finding is obtained.

Specifically, the SOFC including an electrolyte membrane made of a proton conductor differs from the SOFC including an electrolyte membrane made of an oxide ion conductor in the proportion of a current flowing as a drawn current in the external circuit relative to the current produced by the electrochemical reaction consuming a fuel. It is thus difficult to perform stop control based on the drawn current as in PTL 1. The inventors of the present disclosure have found that a fuel cell system can be appropriately controlled by performing stop control of the fuel cell system based on the amount of fuel consumption instead of performing stop control of the fuel cell system based on the drawn current in the operation stop process for the fuel cell system.

In other words, even in the SOFC including an electrolyte membrane made of a proton conductor, the flow rate of fuel consumed by the electrochemical reaction increases as the drawn current flowing in the external circuit increases. The same tendency is found in the SOFC including an electrolyte membrane made of an oxide ion conductor. It can thus be said that the amount of fuel consumption is minimized when the SOFC is in the open circuit state, that is, when the drawn current flowing in the external circuit is zero.

The inventors of the present disclosure have found that damage to the SOFC from fuel shortages can be prevented as long as the fuel cell system is stopped with the fuel flowing in the SOFC at a higher flow rate than the rate of fuel consumption in the open circuit state.

The above finding by the inventors of the present disclosure has not been unclear so far and will solve the problem associated with stop control for SOFCs using proton-conductive electrolyte membranes. Specifically, the present disclosure provides the following aspects.

A fuel cell system in a first aspect of the present disclosure includes: a solid oxide fuel cell that produces electricity from an electrochemical reaction by using a fuel and air and that includes a membrane electrode assembly including a proton-conductive electrolyte membrane, a cathode disposed on a first main surface of the electrolyte membrane, and an anode disposed on a second main surface of the electrolyte membrane; and a controller. In the operation stop process for stopping operation of the fuel cell system, the controller is configured to control supply of the fuel at a higher flow rate than the flow rate of the fuel consumed in the solid oxide fuel cell in the open circuit state.

The flow rate of the fuel consumed in the solid oxide fuel cell in the open circuit state is said to be the minimum flow rate of the fuel consumed in the solid oxide fuel cell per unit time. The operation stop process is a process performed during the period of time after the controller instructs the fuel cell system to stop until, for example, the fuel cell system including auxiliary machinery for supplying the fuel, air, and the like completely stops.

According to the above configuration, in the operation stop process, the controller is configured to control supply of the fuel at a higher flow rate than the minimum flow rate of the fuel consumed in the solid oxide fuel cell. This can prevent fuel shortages in the solid oxide fuel cell including the proton-conductive electrolyte membrane in the operation stop process.

The fuel cell system according to the first aspect of the present disclosure has an advantageous effect of being able to safely stop without damaging the solid oxide fuel cell including the proton-conductive electrolyte membrane.

In a second aspect of the present disclosure, the fuel cell system according to the first aspect may further include a fuel feeder that supplies a hydrogen-containing gas as the fuel to the anode of the solid oxide fuel cell, wherein, in the operation stop process for stopping operation of the fuel cell system, the controller is configured to control the fuel feeder to supply the fuel at a higher flow rate than the flow rate of the fuel consumed in the solid oxide fuel cell in the open circuit state.

According to the above configuration, in the operation stop process for stopping operation of the fuel cell system, the controller can be configured to control the fuel feeder to supply the fuel at a higher flow rate than the flow rate of the fuel consumed in the solid oxide fuel cell in the open circuit state. This can prevent fuel shortages in the solid oxide fuel cell including the proton-conductive electrolyte membrane in the operation stop process.

In a third aspect of the present disclosure, the fuel cell system according to the second aspect may further include a temperature sensor that senses a temperature of the solid oxide fuel cell, wherein, in the operation stop process, the controller is configured to control the fuel feeder to supply the fuel at a higher flow rate than the flow rate of the fuel consumed in the solid oxide fuel cell in the open circuit state until the controller determines that the temperature sensed by the temperature sensor has reached a temperature lower than or equal to a temperature at which hole conduction does not occur in the electrolyte membrane.

The temperature at which hole conduction does not occur in the electrolyte membrane is, for example, 400° C. When the temperature of the solid oxide fuel cell is lower than or equal to 400° C., the electrolyte membrane has high electrical resistance, and hole conduction does not occur.

According to the above configuration, the controller is configured to control the fuel feeder to supply the fuel at a higher flow rate than the flow rate of the fuel consumed in the solid oxide fuel cell in the open circuit state until the temperature of the solid oxide fuel cell decreases to a temperature lower than or equal to a temperature at which hole conduction does not occur. The operation stop process for the fuel cell system can thus be performed in such a manner that no fuel shortages occur more assuredly.

In a fourth aspect of the present disclosure, the fuel cell system according to the second aspect may further include a temperature sensor that senses the temperature of the solid oxide fuel cell, wherein, in the operation stop process, the controller is configured to control the fuel feeder to supply the fuel at a higher flow rate than the flow rate of the fuel consumed in the solid oxide fuel cell in the open circuit state until the controller determines that the temperature sensed by the temperature sensor has reached a temperature lower than or equal to a temperature at which a redox reaction does not occur in the anode.

The temperature at which the redox reaction does not occur in the anode, particularly, the temperature at which Ni contained in the anode is no longer oxidized, is 400° C., more preferably a temperature in the range from 200° C. to 300° C. The redox reaction in the anode results from fuel shortages in the anode.

According to the above configuration, the controller is configured to control the fuel feeder to supply the fuel at a higher flow rate than the flow rate of the fuel consumed in the solid oxide fuel cell in the open circuit state until the temperature of the solid oxide fuel cell decreases to a temperature lower than or equal to a temperature at which the redox reaction does not occur in the anode. The operation stop process for the fuel cell system can thus be performed in such a manner that the redox reaction in the anode due to fuel shortages does not occur.

In a fifth aspect of the present disclosure, the fuel cell system according to any one of the second to fourth aspects may be such that, in the operation stop process, the controller is configured to control the fuel feeder to supply the fuel at a higher flow rate than the flow rate of the fuel consumed in the solid oxide fuel cell in the open circuit state, and the flow rate of the fuel consumed in the solid oxide fuel cell is less than or equal to 90% of the flow rate of the fuel supplied to the solid oxide fuel cell.

According to the above configuration, the controller is configured to control the fuel feeder to supply the fuel at a higher flow rate than the flow rate of the fuel consumed in the solid oxide fuel cell in the open circuit state, preventing fuel shortages in a solid oxide fuel cell including a proton-conductive electrolyte membrane. In addition, the fuel is supplied in such a manner that the flow rate of the fuel consumed in the solid oxide fuel cell is less than or equal to 90% of the flow rate of the fuel supplied to the solid oxide fuel cell. Therefore, local fuel shortages can be prevented even if the fuel flows unevenly to cause uneven fuel concentration in the anode.

In a sixth aspect of the present disclosure, the fuel cell system according to any one of the first to fifth aspects may further include an air feeder that supplies the air to the solid oxide fuel cell, wherein, in the operation stop process, the controller is configured to control the air feeder to supply air at a higher flow rate than the flow rate of air consumed in the solid oxide fuel cell in the open circuit state.

The flow rate of air consumed in the solid oxide fuel cell in the open circuit state is said to be the minimum flow rate of air consumed in the fuel cell system per unit time.

According to the above configuration, in the operation stop process, the controller is configured to control the air feeder to supply air at a higher flow rate than the minimum flow rate of air consumed in the fuel cell system. This can prevent fuel shortages and air shortages in the solid oxide fuel cell including the proton-conductive electrolyte membrane in the operation stop process.

In a seventh aspect of the present disclosure, the fuel cell system according to any one of the second to sixth aspects may further include a switch that switches the solid oxide fuel cell from a closed circuit state to an open circuit state, wherein, in the operation stop process, the controller is configured to control the switch to switch the solid oxide fuel cell from the closed circuit state to the open circuit state and control the fuel feeder to supply the fuel at a higher flow rate than the flow rate of the fuel consumed in the solid oxide fuel cell in the open circuit state.

Since the above configuration includes the switch, the solid oxide fuel cell can be switched from the closed circuit state to the open circuit state. Since the switch is configured to control to switch the solid oxide fuel cell from the closed circuit state to the open circuit state in the operation stop process, the current generated in the solid oxide fuel cell can be minimized. This can reduce heat generation in the solid oxide fuel cell in the operation stop process. The temperature in the fuel cell system can thus be lowered readily in the operation stop process. Furthermore, the solid oxide fuel cell is switched to the open circuit state, and the controller is configured to control the fuel feeder to supply the fuel at a higher flow rate than the flow rate of the fuel consumed in the solid oxide fuel cell in the open circuit state. This can prevent fuel shortages in the solid oxide fuel cell including the proton-conductive electrolyte membrane in the operation stop process.

In an eighth aspect of the present disclosure, the fuel cell system according to any one of the first to seventh aspects may be such that the proton-conductive electrolyte membrane contains a proton-conductive oxide.

A method for controlling a fuel cell system according to a ninth aspect of the present disclosure is a method for controlling a fuel cell system including a solid oxide fuel cell that produces electricity from an electrochemical reaction by using a fuel and air and that includes a membrane electrode assembly including a proton-conductive electrolyte membrane, a cathode disposed on a first main surface of the electrolyte membrane, and an anode disposed on a second main surface of the electrolyte membrane. The method includes supplying the fuel at a higher flow rate than a flow rate of the fuel consumed in the solid oxide fuel cell in an open circuit state in an operation stop process for stopping operation of the fuel cell system.

The flow rate of the fuel consumed in the solid oxide fuel cell in the open circuit state is said to be the minimum flow rate of the fuel consumed in the fuel cell system per unit time. The operation stop process is a process performed during the period of time after the controller instructs the fuel cell system to stop until, for example, the fuel cell system including auxiliary machinery for supplying the fuel, air, and the like completely stops.

The method includes supplying the fuel at a higher flow rate than the minimum flow rate of the fuel consumed in the fuel cell system in the operation stop process. This can prevent fuel shortages in the solid oxide fuel cell including the proton-conductive electrolyte membrane in the operation stop process.

The method for controlling a fuel cell system according to the seventh aspect of the present disclosure has an advantageous effect of being able to safely stop the fuel cell system without damaging the solid oxide fuel cell including the proton-conductive electrolyte membrane.

Embodiments of the present disclosure will be described below with reference to the drawings. Hereinafter, the same or corresponding components are assigned with the same reference signs throughout the drawings, and the redundant description thereof may be omitted.

First Embodiment

A fuel cell system 100 according to a first embodiment of the present disclosure includes a solid oxide fuel cell including a proton-conductive electrolyte membrane. The configuration of the fuel cell system 100 according to the first embodiment will be described below with reference to FIG. 1. FIG. 1 is a block diagram schematically illustrating an example configuration of the fuel cell system 100 according to the first embodiment of the present disclosure.

Referring to FIG. 1, the fuel cell system 100 includes: a fuel feeder 11; an air feeder 12; a membrane electrode assembly 13 including an electrolyte membrane 13a made of a proton conductor, a cathode 13b disposed on a first main surface of the electrolyte membrane 13a, and an anode 13c disposed on a second main surface of the electrolyte membrane 13a; an SOFC stack 15 (solid oxide fuel cell) including one or more membrane electrode assemblies 13 stacked on and connected to each other; a current drawing line 16 for drawing current from the SOFC stack 15 to the outside; and a controller 17. The current drawing line 16 is provided with a switch 14 for alternately switching between an open circuit state in which the current drawn to the outside through the current drawing line 16 is zero and a closed circuit state in which the current is drawn to the outside. The switch 14 switches the SOFC stack 15 from the closed circuit state to the open circuit state in response to a control signal received from the controller 17. Alternatively, the switch 14 switches the SOFC stack 15 from the open circuit state to the closed circuit state in response to a control signal received from the controller 17. The switch 14 is exemplified by, for example, a relay that switches a contact point on/off. FIG. 1 illustrates the open circuit state.

The fuel feeder 11 supplies a hydrogen-containing gas as a fuel to the anode 13c of the membrane electrode assembly 13 in the SOFC stack 15 in response to a control signal received from the controller 17. The hydrogen-containing gas may be produced by the chemical reaction (i.e., reforming reaction) of $CH_4$ or the like in a reformer, or may be produced by water electrolysis.

The air feeder 12 supplies air as an oxidant gas to the cathode 13b of the membrane electrode assembly 13 in the SOFC stack 15 in response to a control signal received from the controller 17.

The electrolyte membrane 13a is composed of an electrolyte material having proton conductivity (i.e., proton conductor). Examples of the proton conductor include, but are not limited to, electrolyte materials represented by $BaCe_{1-x}M_xO_{3-\alpha}$, $BaZr_{1-x-y}Ce_xM_yO_{3-\alpha}$, or $BaZr_{1-x}M_xO_{3-\alpha}$ (M is a trivalent substituent element, the value of x satisfies $0<x<1$, the value of a is an oxygen deficiency and satisfies $0<\alpha<0.5$). The electrolyte membrane 13a has hole conductivity in addition to proton conductivity. Holes corresponding to some or all of protons passing through the electrolyte membrane 13a move from higher potential to lower potential in the electrolyte membrane 13a.

The cathode 13b is an electrode composed of a material having electron conductivity, oxide ion ($O^{2-}$) and proton conductivity, and hydrogen reduction activity. Examples of the material of the cathode 13b include a material represented by composition formula $La_{0.6}Sr_{0.4}Co_{0.2}Fe_{0.8}O_3$, or a mixture of the material and a proton conductor.

The anode 13c is an electrode composed of a material having electron conductivity, proton conductivity, and hydrogen oxidation activity. The material of the anode 13c is, for example, a mixture of Ni and a proton conductor.

The SOFC stack 15 produces electricity from an electrochemical reaction by using a fuel (e.g., hydrogen-containing gas) supplied from the fuel feeder 11 and air (i.e., oxidant gas) supplied from the air feeder 12. Part of the current produced in the SOFC stack 15 flows from the cathode 13b to the anode 13c through the electrolyte membrane 13a because of the hole conductivity of the electrolyte membrane 13a. The rest of the current is drawn to the outside through the current drawing line 16.

In other words, in the SOFC stack 15, protons produced by the electrochemical reaction of hydrogen in the anode 13c are conducted to the cathode 13b from the anode 13c through the electrolyte membrane 13a. The electrochemical reaction between protons and air then takes place in the cathode 13b. Some of holes produced in the electrochemical reaction flows as a current from the cathode 13b to the anode 13c through the electrolyte membrane 13a. The rest of electrons is drawn as a current to the outside through the current drawing line 16. When the switch 14 switches the SOFC stack 15 from the closed circuit state to the open circuit state in response to a control signal received from the controller 17, all holes produced in the electrochemical reaction between protons and air in the cathode 13b flow as a current from the cathode 13b to the anode 13c through the electrolyte membrane 13a.

The controller 17 controls various parts of the fuel cell system 100. For example, the controller 17 controls the fuel feeder 11 to adjust the flow rate of the fuel supplied to the anode 13c or controls the air feeder 12 to adjust the flow rate of air supplied to the cathode 13b. Alternatively, the controller 17 controls the switch 14 so as to switch the SOFC stack 15 to the open circuit state or the closed circuit state.

The controller 17 may have any structure as long as it has a control function. For example, the controller 17 may include an arithmetic processor (not shown) and a memory (not shown) for storing control programs. The arithmetic processor may include, for example, at least one arithmetic circuit. Examples of the arithmetic circuit include microprocessors (MPUs) and CPUs. The memory may include, for example, at least one memory circuit. Examples of the memory circuit include a semiconductor memory. The controller 17 may include a single control unit that performs central control over various parts of the fuel cell system 100 or may include two or more control units that perform decentralized control in cooperation with each other.

Figure 2:
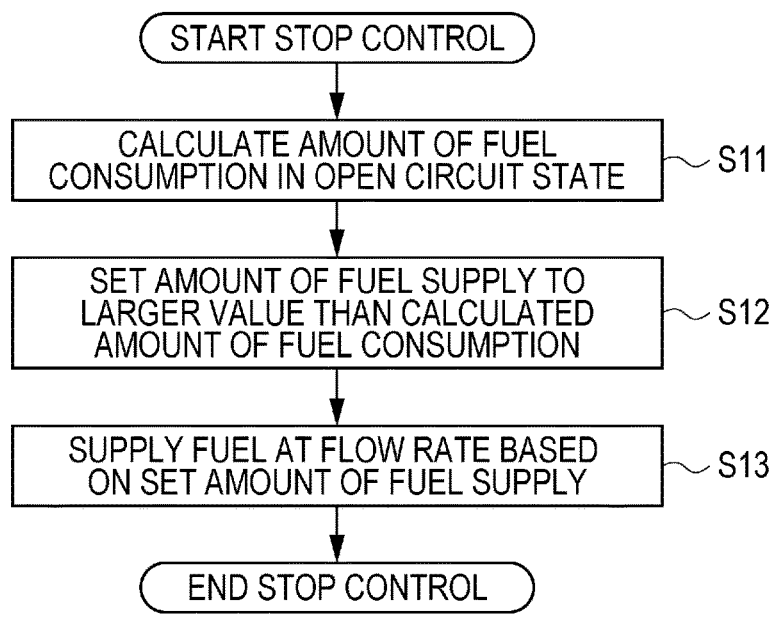
FIG. 2 is a flowchart of an example stop control performed in an operation stop process for the fuel cell system shown in FIG. 1.

Next, the operation stop process in the fuel cell system 100 having the above configuration will be described below with reference to FIG. 2. FIG. 2 is a flowchart of an example stop control performed in the operation stop process for the fuel cell system 100 shown in FIG. 1.

First, the operation stop process is started when the fuel cell system 100 is instructed to stop. Various controls are performed in the operation stop process until the fuel cell system completely stops. As one of these various controls, the following stop control is executed.

In the operation stop process, the controller 17 calculates the amount of fuel consumption in the SOFC stack 15 in the open circuit state (Step S11). The flow rate of the fuel consumed in the SOFC stack 15 in the open circuit state can be determined by carrying out an experiment using the fuel cell system 100 including the SOFC stack 15 in the open circuit state or by carrying out simulation calculation or other methods.

After calculating the amount of fuel consumption in Step S11, the controller 17 sets the amount of the fuel (i.e., the amount of fuel supply) supplied to the anode 13c by the fuel feeder 11 to a value larger than the calculated amount of fuel consumption (Step S12). The controller 17 then controls the fuel feeder 11 so that the fuel is supplied to the anode 13c at a flow rate based on the amount of fuel supply set in Step S12 (Step S13).

As described above, in the fuel cell system 100 according to the first embodiment, the controller 17 controls so that the flow rate of the fuel supplied to the anode 13c by the fuel feeder 11 exceeds the flow rate of the fuel consumed in the SOFC stack 15 in the open circuit state, that is, the SOFC stack 15 when the current drawn through the current drawing line 16 is zero.

By the controller 17 controlling the fuel feeder 11 in this way, the fuel can be supplied in the operation stop process at a higher flow rate than the flow rate of the fuel consumed in the SOFC stack 15 in the open circuit state. The flow rate of the fuel consumed in the SOFC stack 15 in the open circuit state is the minimum flow rate of the fuel consumed in the SOFC stack 15 per unit time. In the operation stop process, the controller 17 can thus control the fuel feeder 11 so that the fuel is supplied at a higher flow rate than the minimum flow rate of the fuel consumed in the fuel cell system 100. This can prevent fuel shortages in the SOFC stack 15 in the operation stop process.

In the operation stop process, the controller 17 may control the fuel feeder 11 so that the flow rate of the fuel supplied to the anode 13c of the SOFC stack 15 satisfies the following conditions.

Specifically, in the operation stop process, the controller 17 controls the fuel feeder 11 so that the fuel is supplied at a higher flow rate than the flow rate of the fuel consumed in the SOFC stack 15 in the open circuit state, and the flow rate of the fuel consumed in the SOFC stack 15 is less than or equal to 90% of the flow rate of the fuel supplied to the SOFC stack 15. Here, 90% is on a molar basis.

By the fuel feeder 11 supplying the fuel in an amount including a margin of safety in this way, local fuel shortages can be prevented even if the fuel flows unevenly to cause uneven fuel concentration in the anode 13c.

Figure 3:
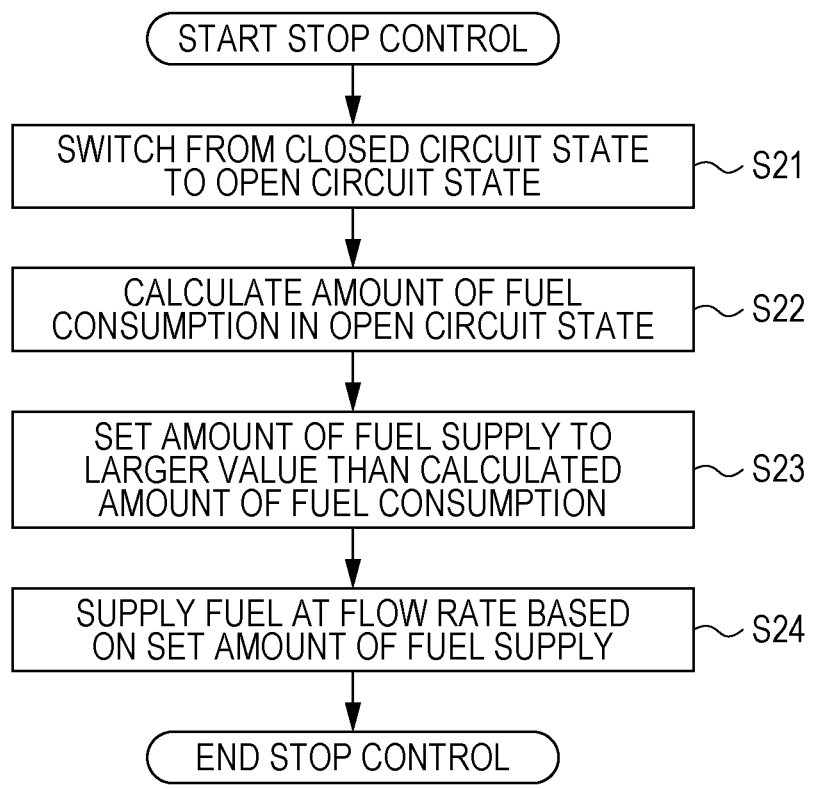
FIG. 3 is a flowchart of an example stop control performed in an operation stop process for the fuel cell system shown in FIG. 1.

As shown in FIG. 3, the SOFC stack 15 may be switched to the open circuit state before the stop control described above is performed in the operation stop process. FIG. 3 is a flowchart of an example stop control performed in the operation stop process for the fuel cell system 100 shown in FIG. 1.

In the operation stop process, the controller 17 first controls the switch 14 so that the SOFC stack 15 is switched from the closed circuit state to the open circuit state. The switch 14 switches the SOFC stack 15 from the closed circuit state to the open circuit state in response to a control signal received from the controller 17 (Step S21). The subsequent processes from Step S22 to Step S24 are the same as those from Step S11 to Step S13 shown in FIG. 2, and the redundant description thereof is thus omitted.

The process of Step S21 is not necessarily performed before Step S22. The process of Step S21 is performed at the latest before the process of supplying the fuel in Step S24.

When the switch 14 is controlled so that the SOFC stack 15 is switched from the closed circuit state to the open circuit state in the operation stop process, the current generated in the SOFC stack 15 can be minimized. In the operation stop process, the SOFC stack 15 generates less heat inside, and the temperature in the fuel cell system 100 can be lowered readily.

Figure 4:
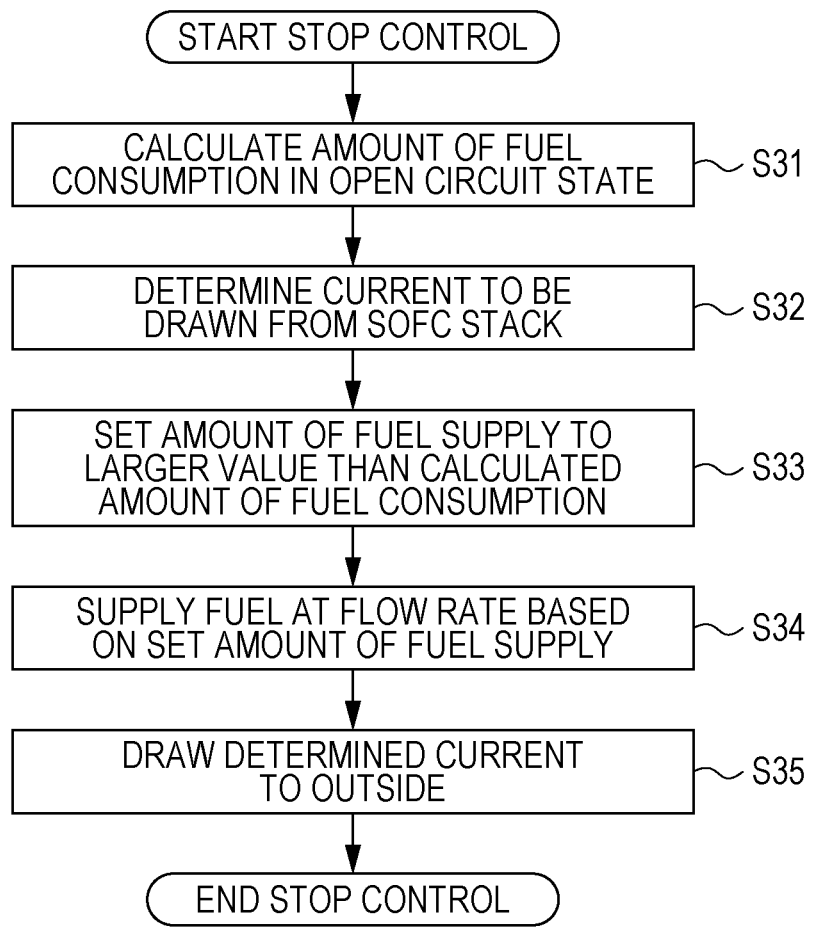
FIG. 4 is a flowchart of an example stop control performed in an operation stop process for the fuel cell system shown in FIG. 1.

As shown in FIG. 4, the stop control described above may be performed with a certain current drawn to the outside while the SOFC stack 15 remains in the closed circuit state. FIG. 4 is a flowchart of an example stop control performed in the operation stop process for the fuel cell system 100 shown in FIG. 1.

In the operation stop process, the controller 17 calculates the amount of fuel consumption in the SOFC stack 15 in the open circuit state (Step S31). Step S31 and the following Steps S33 and S34 are the same processes as Step S11 to Step S13 shown in FIG. 2, and the redundant description thereof is thus omitted.

After the controller 17 calculates the amount of fuel consumption in the SOFC stack 15 in the open circuit state, the controller 17 next determines the current to be drawn from the SOFC stack 15 (to-be-drawn current) (Step S32). The controller 17 then sets the amount of fuel supplied to the SOFC stack 15 to a value larger than the amount of fuel consumption calculated in Step S31 (Step S33).

In the operation stop process, the stop control is performed with a certain current drawn to the outside. The flow rate of the fuel consumed (amount of fuel consumption) in the SOFC stack 15 is the sum of the flow rate of the fuel consumed in the SOFC stack 15 in the open circuit state and the flow rate of the fuel consumed to generate a current to be drawn the outside. In Step S33, the controller 17 thus sets the flow rate of the fuel supplied to the SOFC stack 15 to a larger flow rate than the sum of the flow rate of the fuel consumed in the SOFC stack 15 in the open circuit state and the flow rate of the fuel consumed to generate a current to be drawn the outside.

Next, the controller 17 controls the fuel feeder 11 so that the fuel is supplied to the SOFC stack 15 at a flow rate based on the amount of fuel supply set in Step S33 (Step S34). The controller 17 then controls so that the current determined in Step S32 is drawn to the outside through the current drawing line 16 (Step S35).

Figure 5:
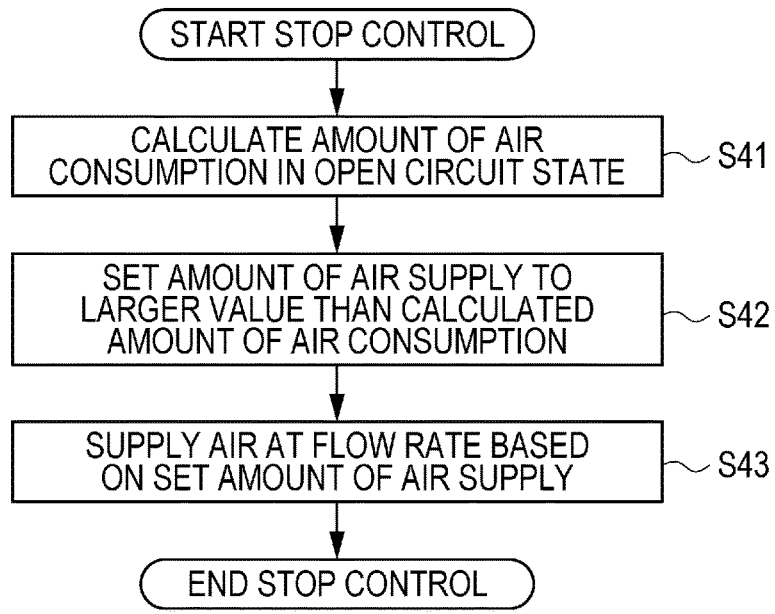
FIG. 5 is a flowchart of an example stop control performed in an operation stop process for the fuel cell system shown in FIG. 1.

In the stop control in the operation stop process described above, the fuel supply control with the fuel feeder 11 is described. The air supply control with the air feeder 12 may be performed as shown in FIG. 5 in the same manner as the fuel supply control. FIG. 5 is a flowchart of an example stop control performed in the operation stop process for the fuel cell system 100 shown in FIG. 1. The stop control shown in FIG. 5 is performed in parallel with the stop control shown in FIG. 2 after the fuel cell system 100 is instructed to stop.

In the operation stop process, the controller 17 calculates the amount of air consumption in the SOFC stack 15 in the open circuit state (Step S41). The flow rate of air consumed in the SOFC stack 15 in the open circuit state can be determined by carrying out an experiment using the fuel cell system 100 including the SOFC stack 15 in the open circuit state or by carrying out simulation calculation or other methods.

After calculating the amount of air consumption in Step S41, the controller 17 sets the amount of air (i.e., the amount of air supply) supplied to the cathode 13b by the air feeder 12 to a value larger than the calculated amount of air consumption (Step S42). The controller 17 then controls the air feeder 12 so that air is supplied to the cathode 13b at a flow rate based on the amount of air supply set in Step S42 (Step S43).

As described above, in the fuel cell system 100 according to the first embodiment, the controller 17 controls so that the flow rate of air supplied to the cathode 13b by the air feeder 12 exceeds the flow rate of air consumed in the SOFC stack 15 in the open circuit state, that is, the SOFC stack 15 when the current drawn through the current drawing line 16 is zero.

By the controller 17 controlling the air feeder 12 in this way, air can also be supplied in the operation stop process at a higher flow rate than the flow rate of air consumed in the SOFC stack 15 in the open circuit state. The flow rate of air consumed in the SOFC stack 15 in the open circuit state is the minimum flow rate of air consumed in the SOFC stack 15 per unit time. In the operation stop process, the controller 17 thus controls the air feeder 12 so that air is supplied at a higher flow rate than the minimum flow rate of air consumed in the fuel cell system 100. This can prevent air shortages in the SOFC stack 15 in the operation stop process.

The control of the amount of air supply by the air feeder 12 may also be performed after the SOFC stack 15 is switched to the open circuit state in the operation stop process as in the control of the amount of fuel supply by the fuel feeder 11. The control of the amount of air supply may be performed with a current drawn from the SOFC stack 15 to the outside after the current to be drawn from the SOFC stack 15 is determined. To perform the stop control with the current drawn to the outside, the controller 17 sets the flow rate of air supplied to the SOFC stack 15 to a larger flow rate than the sum of the flow rate of air consumed in the SOFC stack 15 in the open circuit state and the flow rate of air consumed to generate a current to be drawn the outside.

Second Embodiment

Figure 6:
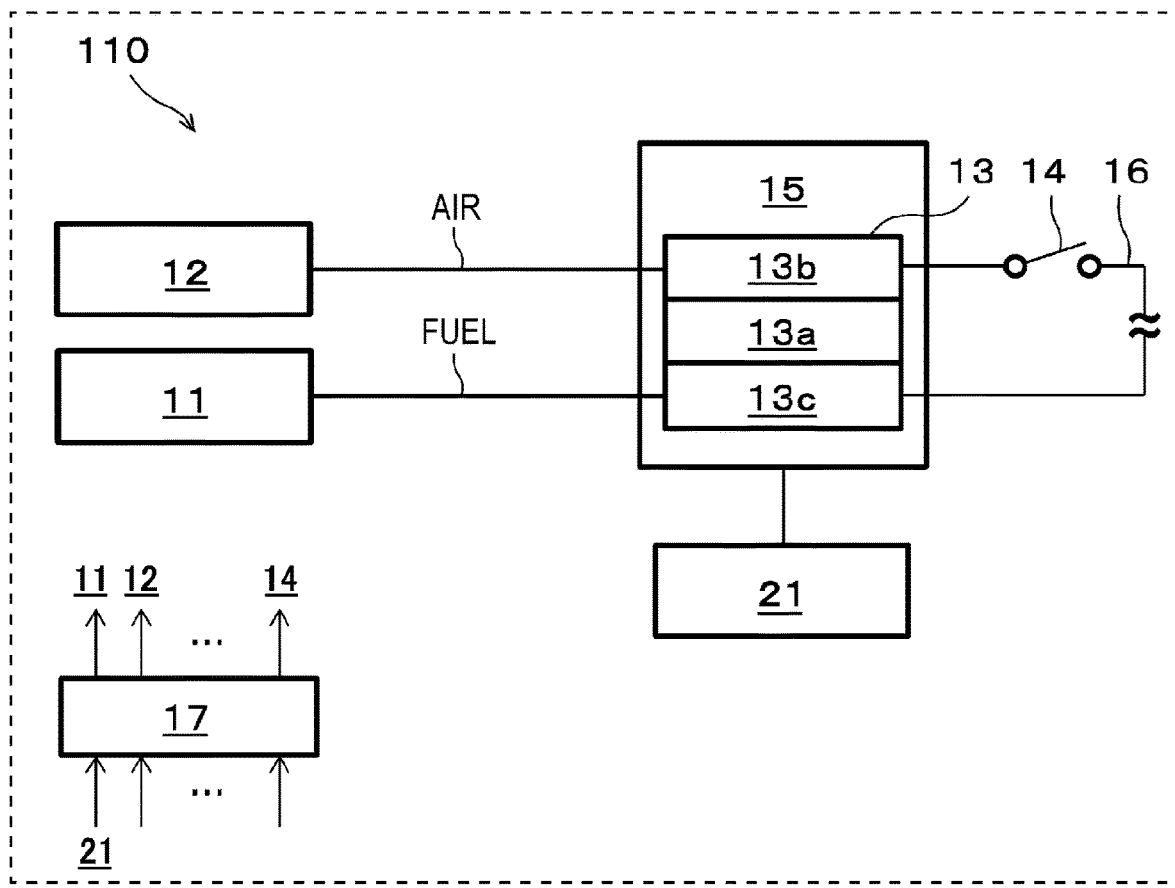
FIG. 6 is a block diagram schematically illustrating an example configuration of a fuel cell system according to a second embodiment of the present disclosure.

The configuration of a fuel cell system 110 according to a second embodiment of the present disclosure will be described with reference to FIG. 6. FIG. 6 is a block diagram schematically illustrating an example configuration of the fuel cell system 110 according to the second embodiment of the present disclosure.

Referring to FIG. 6, the fuel cell system 110 according to the second embodiment differs from the fuel cell system 100 according to the first embodiment in that the fuel cell system 110 further includes a temperature sensor 21 which senses the temperature of the SOFC stack 15. Except for further including the temperature sensor 21, the fuel cell system 110 according to the second embodiment has the same configuration as the fuel cell system 100 according to the first embodiment. Of the member of the fuel cell system 110 according to the second embodiment, the same members as the members of the fuel cell system 100 according the first embodiment are assigned with the same reference signs, and the redundant description thereof is omitted.

The temperature sensor 21 senses temperatures at one or more points in the SOFC stack 15 and outputs the temperatures to the controller 17. The temperature sensor 21 is exemplified by, for example, a temperature sensor using a thermocouple. The temperatures in the SOFC stack 15 may include, for example, the temperature of the anode 13c or the electrolyte membrane 13a.

The temperature sensor 21 may be configured to sense the temperature of the SOFC stack 15 by directly measuring the SOFC stack 15. The temperature sensor 21 may be configured to indirectly sense the temperature of the SOFC stack 15 by measuring the temperature of another member that correlates with the temperature of the SOFC stack 15. For example, the temperature of a structure adjacent to the SOFC stack 15 in the fuel cell system 110 may be measured as long as the temperature of the SOFC stack 15 can be determined. Alternatively, the temperature of the fuel or air flowing through the SOFC stack 15 may be measured.

Next, the operation stop process in the fuel cell system 110 having the above configuration will be described below with reference to FIG. 7. FIG. 7 is a flowchart of an example stop control performed in the operation stop process for the fuel cell system 110 shown in FIG. 6.

In the operation stop process, the controller 17 calculates the amount of fuel consumption in the SOFC stack 15 in the open circuit state (Step S51). The flow rate of the fuel consumed in the SOFC stack 15 in the open circuit state may be determined by carrying out an experiment using the fuel cell system 110 including the SOFC stack 15 in the open circuit state or by carrying out simulation calculation or other methods.

After calculating the amount of fuel consumption in Step S51, the controller 17 sets the amount of the fuel supplied to the anode 13c by the fuel feeder 11 to a value larger than the calculated amount of fuel consumption (Step S52). The controller 17 then controls the fuel feeder 11 so that the fuel is supplied to the anode 13c at a flow rate based on the amount of fuel supply set in Step S52 (Step S53).

The controller 17 may control the fuel feeder 11 so that the fuel is supplied at a higher flow rate than the flow rate of the fuel consumed in the SOFC stack 15 in the open circuit state, and the flow rate of the fuel consumed in the SOFC stack 15 is less than or equal to 90% of the flow rate of the fuel supplied to the SOFC stack 15.

Next, the controller 17 determines whether the temperature of the SOFC stack 15 is lower than or equal to a predetermined temperature or not on the basis of the temperature sensed by the temperature sensor 21 (Step S54). The predetermined temperature is a temperature lower than or equal to a temperature at which hole conduction does not occur in the electrolyte membrane 13a and may be, for example, a temperature lower than or equal to 500° C., preferably a temperature lower than or equal to 400° C. As the temperature of the SOFC stack 15 decreases, the electrical resistance of the electrolyte membrane 13a increases, which inhibits hole conduction. It is known that, when the temperature of the SOFC stack 15 decreases to 500° C. or lower, preferably 400° C. or lower, hole conduction does not occur in the electrolyte membrane 13a.

Alternatively, the predetermined temperature may be a temperature at which the redox reaction does not occur in the anode 13c, that is, a temperature lower than or equal to a temperature at which Ni contained in the anode 13c is no longer oxidized by air from the cathode 13b. The temperature at which Ni is no longer oxidized is 400° C., more preferably a temperature in the range from 200° C. to 300° C.

If the controller 17 determines that the temperature of the SOFC stack 15 is higher than the predetermined temperature ("NO" in Step S54) in determination in Step S54, then the flow returns to Step S51 and repeats the processes from S51 to Step S53. If the controller 17 determines that the temperature of the SOFC stack 15 is lower than or equal to the predetermined temperature ("YES" in Step S54) in determination in Step S54, then the controller 17 controls the fuel feeder 11 so as to stop fuel supply (Step S55). The fuel cell system 110 then terminates stop control.

As described above, the controller 17 controls the fuel feeder 11 so that the flow rate of the fuel supplied to the anode 13c by the fuel feeder 11 in the operation stop process exceeds the flow rate of the fuel consumed in the SOFC stack 15 in the open circuit state. In other words, the controller 17 controls the fuel feeder 11 so that the fuel is supplied at a higher flow rate than the minimum flow rate of the fuel consumed in the solid oxide fuel cell. This can prevent fuel shortages in the anode 13c of the SOFC stack 15 including a proton-conductive electrolyte membrane in the operation stop process.

The controller 17 controls the fuel feeder 11 so that the fuel is continuously supplied until the temperature of the SOFC stack 15 decreases to a temperature lower than or equal to the predetermined temperature. When the predetermined temperature is set to a temperature at which hole conduction does not occur, the fuel is continuously supplied until the temperature of the SOFC stack 15 becomes a temperature at which hole conduction does not occur in the electrolyte membrane 13a. Thus, the supply of the fuel is not stopped in a temperature range in which hole conduction takes place, preventing fuel shortages in the anode 13c.

When the predetermined temperature is set to a temperature at which the redox reaction does not occur in the anode 13c, the fuel is continuously supplied as long as the SOFC stack 15 is in a temperature range in which Ni may be oxidized in the anode 13c. This can prevent air from coming from the cathode 13b when the temperature of the SOFC stack 15 is in a temperature range in which Ni may be oxidized. Therefore, the oxidation of Ni can be prevented in the anode 13c.

In the fuel cell system 110 according to the second embodiment, the controller 17 may control the switch 14 so that the SOFC stack 15 is switched from the closed circuit state to the open circuit state in the stop control described above, as in the stop control shown in FIG. 3 for the fuel cell system 100 according to the first embodiment. The stop control described above may be performed with a certain current drawn to the outside while the SOFC stack 15 remains in the closed circuit state, as in the stop control shown in FIG. 4 for the fuel cell system 100 according to the first embodiment.

In the fuel cell system 110 according to the second embodiment, the controller 17 may, in parallel with the control of the flow rate of fuel, also control the air feeder 12 so that the flow rate of air supplied to the cathode 13b by the air feeder 12 exceeds the flow rate of air consumed in the SOFC stack 15 in the open circuit state, as in the stop control shown in FIG. 5 for the fuel cell system 100 according to the first embodiment.

The present disclosure can be applied to a fuel cell system including a solid oxide fuel cell having a proton conductor as an electrolyte membrane.

What is claimed is:

1. A fuel cell system comprising:
a solid oxide fuel cell that produces electricity from an electrochemical reaction by using a fuel and air and that includes a membrane electrode assembly including a proton-conductive electrolyte membrane, a cathode disposed on a first main surface of the electrolyte membrane, and an anode disposed on a second main surface of the electrolyte membrane; and
a controller,
wherein, in an operation stop process for stopping operation of the fuel cell system, the controller is configured to control supply of the fuel at a higher flow rate than a flow rate of the fuel consumed in the solid oxide fuel cell in an open circuit state.

2. The fuel cell system according to claim 1, further comprising:
a fuel feeder that supplies a hydrogen-containing gas as the fuel to the anode of the solid oxide fuel cell,
wherein, in the operation stop process for stopping operation of the fuel cell system, the controller is configured to control the fuel feeder to supply the fuel at a higher flow rate than the flow rate of the fuel consumed in the solid oxide fuel cell in the open circuit state.

3. The fuel cell system according to claim 2, further comprising:
a temperature sensor that senses a temperature of the solid oxide fuel cell,
wherein, in the operation stop process, the controller is configured to control the fuel feeder to supply the fuel at a higher flow rate than the flow rate of the fuel consumed in the solid oxide fuel cell in the open circuit state until the controller determines that the temperature sensed by the temperature sensor has reached a temperature lower than or equal to a temperature at which hole conduction does not occur in the electrolyte membrane.

4. The fuel cell system according to claim 2, further comprising:
a temperature sensor that senses a temperature of the solid oxide fuel cell,
wherein, in the operation stop process, the controller is configured to control the fuel feeder to supply the fuel at a higher flow rate than the flow rate of the fuel consumed in the solid oxide fuel cell in the open circuit state until the controller determines that the temperature sensed by the temperature sensor has reached a temperature lower than or equal to a temperature at which a redox reaction does not occur in the anode.

5. The fuel cell system according to claim 2, wherein, in the operation stop process, the controller is configured to control the fuel feeder to supply the fuel at a higher flow rate than the flow rate of the fuel consumed in the solid oxide fuel cell in the open circuit state, and the flow rate of the fuel consumed in the solid oxide fuel cell is less than or equal to 90% of the flow rate of the fuel supplied to the solid oxide fuel cell.

6. The fuel cell system according to claim 1, further comprising:
an air feeder that supplies the air to the solid oxide fuel cell,
wherein, in the operation stop process, the controller is configured to control the air feeder to supply air at a higher flow rate than a flow rate of air consumed in the solid oxide fuel cell in the open circuit state.

7. The fuel cell system according to claim 2, further comprising:
a switch that switches the solid oxide fuel cell from a closed circuit state to an open circuit state,
wherein, in the operation stop process, the controller is configured to control the switch to switch the solid oxide fuel cell from the closed circuit state to the open circuit state and control the fuel feeder to supply the fuel at a higher flow rate than the flow rate of the fuel consumed in the solid oxide fuel cell in the open circuit state.

8. The fuel cell system according to claim 1, wherein the proton-conductive electrolyte membrane contains a proton-conductive oxide.

9. A method for controlling a fuel cell system including a solid oxide fuel cell that produces electricity from an electrochemical reaction by using a fuel and air and that includes a membrane electrode assembly including a proton-conductive electrolyte membrane, a cathode disposed on a first main surface of the electrolyte membrane, and an anode disposed on a second main surface of the electrolyte membrane, the method comprising:
supplying the fuel at a higher flow rate than a flow rate of the fuel consumed in the solid oxide fuel cell in an open circuit state in an operation stop process for stopping operation of the fuel cell system.

* * * * *